United States Patent
Artelsmair et al.

(10) Patent No.: US 6,927,360 B2
(45) Date of Patent: Aug. 9, 2005

(54) METHOD FOR CONTINUOUSLY REGULATING OR TRACKING A POSITION OF A WELDING TORCH OR A WELDING HEAD

(75) Inventors: Josef Artelsmair, Wartberg/Krems (AT); Michael Brunner, Seiersberg (AT); Rudolf Etzenberger, Scharnstein (AT)

(73) Assignee: Fronius International GmbH, Pettenbach (AT)

( * ) Notice: Subject to any disclaimer, the term of this patent is extended or adjusted under 35 U.S.C. 154(b) by 42 days.

(21) Appl. No.: 10/239,810

(22) PCT Filed: Apr. 3, 2001

(86) PCT No.: PCT/AT01/00096

§ 371 (c)(1),
(2), (4) Date: Sep. 25, 2002

(87) PCT Pub. No.: WO01/76799

PCT Pub. Date: Oct. 18, 2001

(65) Prior Publication Data

US 2003/0038156 A1 Feb. 27, 2003

(30) Foreign Application Priority Data

Apr. 5, 2000 (AT) .................................. A 580/2000

(51) Int. Cl.⁷ .............................................. B23K 9/127
(52) U.S. Cl. .............................. 219/124.22; 219/125.12
(58) Field of Search .................. 219/124.22, 124.34, 219/125.12

(56) References Cited

U.S. PATENT DOCUMENTS

| | | | | |
|---|---|---|---|---|
| 4,151,395 A | * | 4/1979 | Kushner et al. | 219/125.12 |
| 4,316,075 A | * | 2/1982 | Isoya et al. | 219/124.22 |
| 4,350,868 A | * | 9/1982 | Takagi et al. | 219/125.12 |
| 4,380,695 A | * | 4/1983 | Nelson | 219/125.12 |
| 4,525,619 A | | 6/1985 | Ide et al. | |
| 4,556,777 A | * | 12/1985 | Sarugaku et al. | 219/124.34 |
| 4,785,155 A | | 11/1988 | Kishi et al. | |
| 4,906,814 A | | 3/1990 | Toyoda et al. | |
| 5,130,514 A | | 7/1992 | Kugai et al. | |
| 5,780,808 A | | 7/1998 | Moon | |

FOREIGN PATENT DOCUMENTS

| | | |
|---|---|---|
| DE | 26 45 788 | 10/1976 |
| DE | 269 118 | 12/1987 |
| DE | 38 44 124 | 12/1988 |
| DE | 43 17 178 | 5/1993 |
| EP | 0 428 755 | 5/1991 |
| JP | 60 258 396 | 12/1985 |

* cited by examiner

Primary Examiner—Clifford C. Shaw
(74) Attorney, Agent, or Firm—Collard & Roe, P.C.

(57) ABSTRACT

The invention describes a method of continuously controlling and tracking a position of a welding torch (10) and welding head relative to a weld seam to be produced on a workpiece (16), whereby the welding torch (10), spaced at a distance apart from a workpiece (16) and the weld seam, effects a pendulum motion which is superimposed on its linear welding motion, during which state variables, in particular an ohmic resistance or a current and/or a voltage, are detected as they change in time. The lateral deviation of the welding torch (10) from the weld seam, in particular from the welding line centre, and/or the height of the welding torch (10) above the workpiece (16) and the welding head are derived from the detected actual values and signals in order to control and track the position of the welding torch (10). Depending on periodically occurring process phases of a welding process, the measurement value detection routine for at least one measurement signal, in particular to detect the state variable, is run at fixed instants and/or states of the periodically recurring process phases of the welding process.

19 Claims, 4 Drawing Sheets

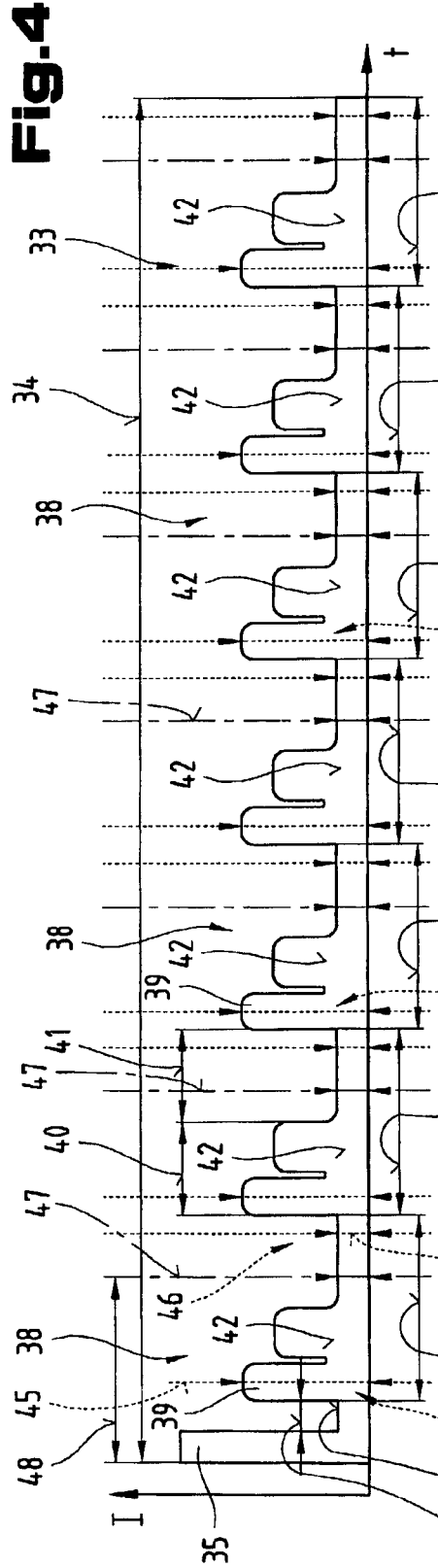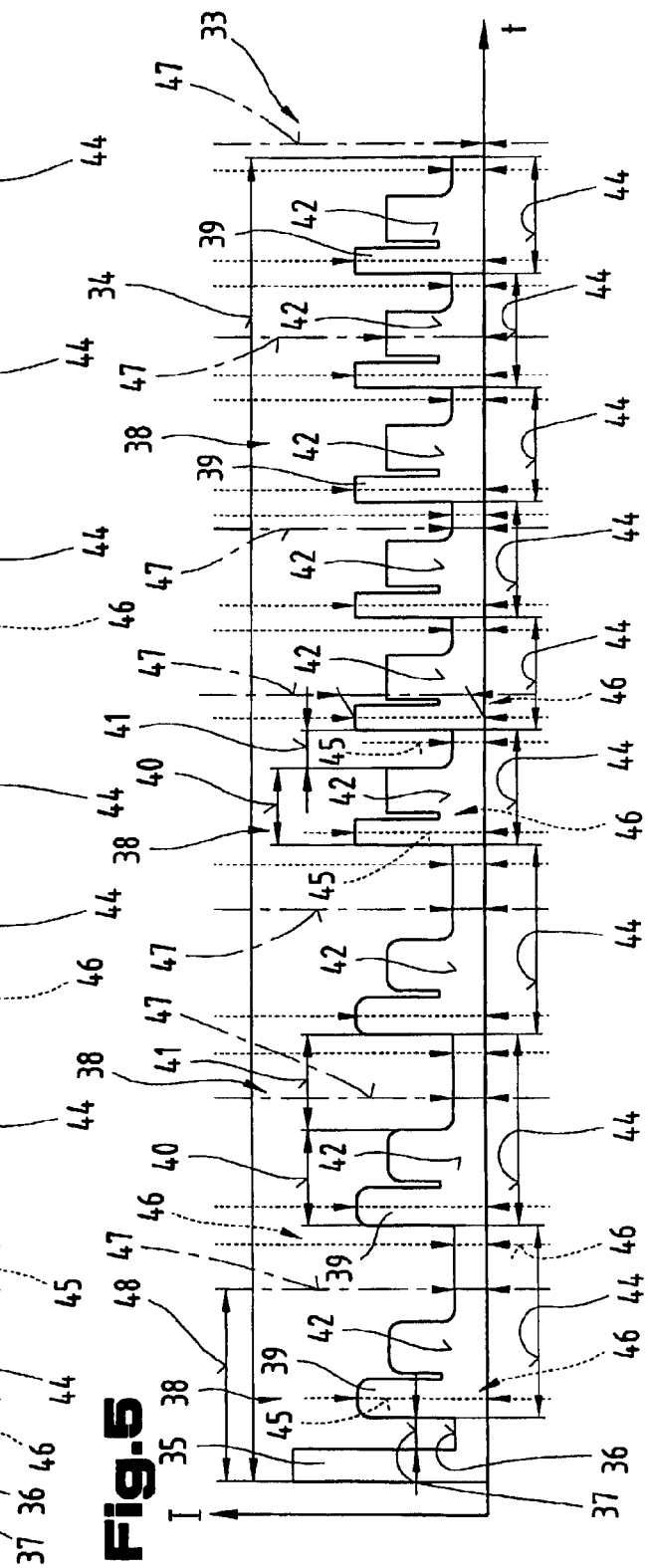

METHOD FOR CONTINUOUSLY REGULATING OR TRACKING A POSITION OF A WELDING TORCH OR A WELDING HEAD

CROSS REFERENCE TO RELATED APPLICATIONS

Applicants claim priority under 35 U.S.C. §119 of Austrian Application No. A580/2000 filed Apr. 5, 2000. Applicants also claim priority under 35 U.S.C. §365 of PCT/AT01/00096 filed Apr. 3, 2001. The international application under PCT article 21(2) was not published in English.

The invention relates to a method of continuously controlling and tracking a position of a welding torch and a welding head relative to a weld seam to be produced on a workpiece, whereby the welding torch, spaced at a distance from a workpiece and the welding seam, effects a pendulum motion superimposed on its linear welding motion, during which state variables, in particular an ohmic resistance or a current and/or a voltage, are detected as they vary in time, the detected actual values being used to determine the lateral deviation of the welding torch from the weld seam, in particular the welding centre line, and/or the height of the welding torch above the workpiece and weld seam in order to control and track the position of the welding torch, and a method of generating a signal enabling a position of a welding torch and a welding head to be continuously controlled and tracked.

Patent specification DE 43 17 178 A discloses a method of continuously controlling the position of a welding torch and welding head relative to a weld seam to be produced by the welding head, whereby the welding head, spaced at a distance above the weld seam, effects a pendulum motion superimposed on its linear welding motion, whilst the ohmic resistance of the arc or a similar variable, which varies over time, is measured. A measure of the height of the welding head above the welding seam and the lateral deviation of the welding head from the weld seam are respectively derived from the signal and input at the control circuit. The measurement values and signals for the pendulum half-waves on the right-hand side of the weld seam are separated from the measurement values and signals for the pendulum half-waves on the left-hand side of the weld seam. One group of signals thus obtained is entered at the control circuit as a height actual value and the other group signals thus obtained is entered as a lateral actual value.

Also known from patent specification DE 38 44 124 A1 is an automatic copying method for a welding torch in an arc welding robot, whereby, when welding a fillet joint, welding is effected at an oscillation mid-point by the arc welding robot with a consumable electrode, whilst the welding torch is displaced in a weaving motion across a weld joint, in other words in a pendulum motion. With this method, the integrated current values of the two oscillating ends are compared with an integrated current value of an oscillation mid-point in order to prevent the fillet welding line from moving against a top plate of the workpiece and thereby correct the position of the welding torch depending on the deviation.

Patent specification DE 26 45 788 A1 describes a method and a device for mechanically guiding a welding head, whereby the integral welding current of the periodically oscillating welding torch or welding head is measured at the two reversing points of the pendulum motion, irrespective of the number of wire electrodes melted off by the welding torch, and the welding head is guided at the centre of the weld line in a known manner by comparing them.

Patent specification U.S. Pat. No. 5,780,808 A describes an automated arc welding method for welding with a robot, whereby the arc current is sensed in order to derive signals for the position of the welding torch above the workpiece. Not only does this make it possible to position the workpiece horizontally, it also allows the position of the welding torch relative to the weld line to be adjusted if the workpiece is in an inclined position. The position of the weld line centre is determined in such a way that the welding torch is guided relative to the weld line centre on the basis of the arc current.

Another method of controlling the position of a welding torch relative to a welding line is known from patent specification U.S. Pat. No. 4,906,814 A1, whereby signals are derived from the sensed arc current and used to determine the position of the welding torch. To this end, the welding torch again effects a pendulum motion and the varying states of the arc are taken into account.

The disadvantage of the known methods described above is that additional measuring equipment is needed in order to detect and measure the state variables and has to be connected by cables to the relevant elements on the welding torch in order to sense the state variables of the welding process, after which the sensed signals are forwarded to the robot controller for a desired/actual comparison.

The underlying objective of the invention is to propose a method of continuously controlling and tracking a position of a welding torch and welding head relative to a weld seam to be produced on a workpiece and a method of generating a signal whereby measurements can be sensed and the quality of the signal for controlling positioning improved without the need for additional external components, such as measuring apparatus for example.

This objective is achieved by the invention due to the fact that the actual values dependent on processing state are evaluated by the control system of the welding device or at least another control system in the welding device, whereupon the control system transmits at least one or several correction value(s) for the position of the welding torch to a device or system linked to the welding device, in particular a welding robot or robot system. The advantage of this is that because the entire evaluation is performed by only one device, in particular by the welding device, delays in the time needed to run data exchanges can be minimised. Another advantage resides in the fact that the welding device makes allowance for unforeseen external process influences or process disruptions when establishing the positioning values, preventing them from disrupting the welding process and affecting the position adjustments.

The objective is also achieved by the invention due to the fact that, during periodically recurring process phases of a welding process, the measurement value detection routine for at least one measurement signal, in particular to detect the state variable, is run at specified instants and/or states during the periodically recurring process phases of the welding process. The advantage of this approach is that the measurement value detection routine can be correlated with the welding process, enabling the individual welding state during the welding process to be taken into account when generating the signals and actual values needed for positioning purposes. One particularly significant advantage is that by using a programme data bank, welding process parameters for process phases can be correlated with parameters for measurement signals, as a result of which optimum measuring results will always be obtained for the most varied of process phases, enabling external influences on the state variables of the welding process to be compensated.

Also of advantage is the fact that several measurement signals can be grouped to obtain a common signal, which significantly improves the quality of the signal.

The invention will be described in more detail with reference to the illustrated embodiments.

Of these:

FIG. 4 is a simplified, schematic diagram of a welding process run by a welding device;

FIG. 5 is a simplified, schematic diagram showing another welding process of the welding device;

Firstly, it should be pointed out that the same reference numbers are used for common parts of the individual embodiments.

Figure 1:
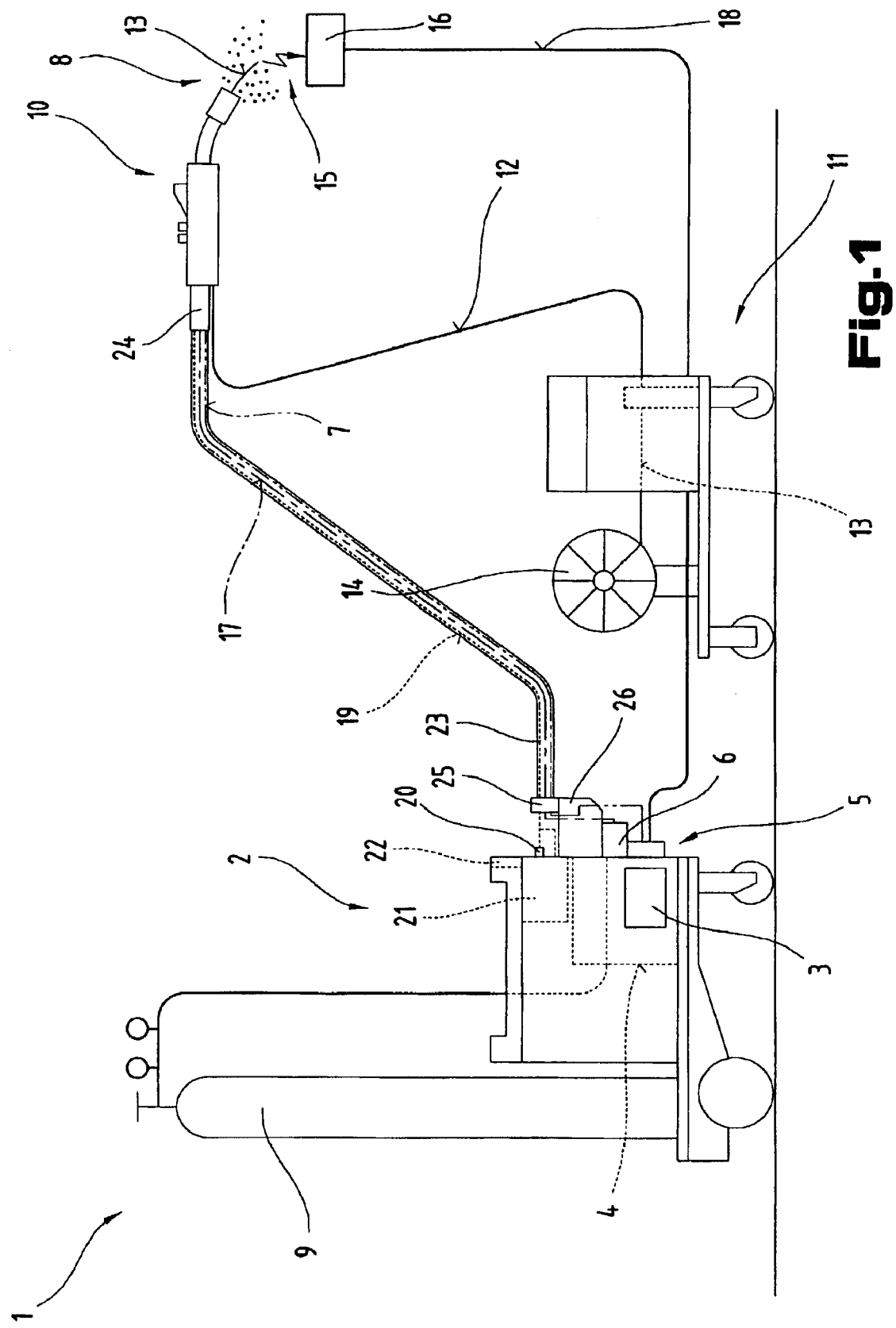
FIG. 1 is a schematic diagram of a welding machine and welding device.

FIG. 1 illustrates a welding device 1 for a whole range of welding processes, e.g. MIG-MAG welding and TIG welding or electrode welding processes. Clearly, the solution proposed by the invention may be used with a current source or welding current source.

The welding device 1 has a current source 2 with a power component 3, a control system 4 and a switching element 5 co-operating with the power component 3 and control system 4. The switching element 5 or the control system 4 is connected to a control valve 6 incorporated in a supply line 7 for a gas 8, in particular an inert gas such as $CO_2$, helium or argon and such like, running between a gas storage 9 and a welding torch 10.

Furthermore, a wire feed device 11 such as commonly used for MIG-MAG welding may also be activated via the control system 4 in order to feed a welding wire 13 from a supply reel 14 through a wire guide line 12 into the region of the welding torch 10. Clearly, the wire feed device 11 could also be integrated in the welding device 1, in particular in the basic housing, in a manner known from the prior art, rather than used as an add-on device as illustrated in FIG. 1.

The current needed to strike an arc 15 between the welding wire 13 and a workpiece 16 is fed via a welding line 17 from the power component 3 of the current source 2 to the welding torch 10 and the welding wire 13, the workpiece 16 to be welded also being connected to the welding device 1, in particular to the current source 2, via another welding line 18 so that a current circuit can be established across the arc 15.

In order to cool the welding torch 10, the welding torch 10 can be connected via a cooling circuit 19, with an integrated flow indicator 20, to a fluid container, in particular a water container 21, so that the cooling circuit 19, in particular a fluid pump used to pump the liquid contained in the water container 21, can be activated when the welding torch 10 is switched on, thereby enabling the welding torch 10 and the welding wire 13 to be cooled.

The welding device 1 also has an input and/or output device 22, by means of which a whole range of settings can be entered for welding parameters and operating modes of the welding device 1. The welding parameters entered at the input and/or output device 22 are then forwarded to the control system 4, from where they are applied to the individual components of the welding system and the welding device 1.

In the embodiment illustrated as an example here, the welding torch 10 is also connected to the welding device 1 and the welding system by means of a hose pack 23. The individual lines from the welding device 1 to the welding torch 10 are disposed in the hose pack 23. The hose pack 23 is connected by means of a connector device 24, known from the prior art, to the welding torch 10, whilst the individual lines in the hose pack 23 are connected to the individual contacts of the welding device 1 by means of connecting sockets and plug connectors. To relieve tension on the hose pack 23, the hose pack 23 is connected via a tension-relieving device 25 to a housing 26, in particular the basic housing of the welding device 1.

Figure 2:
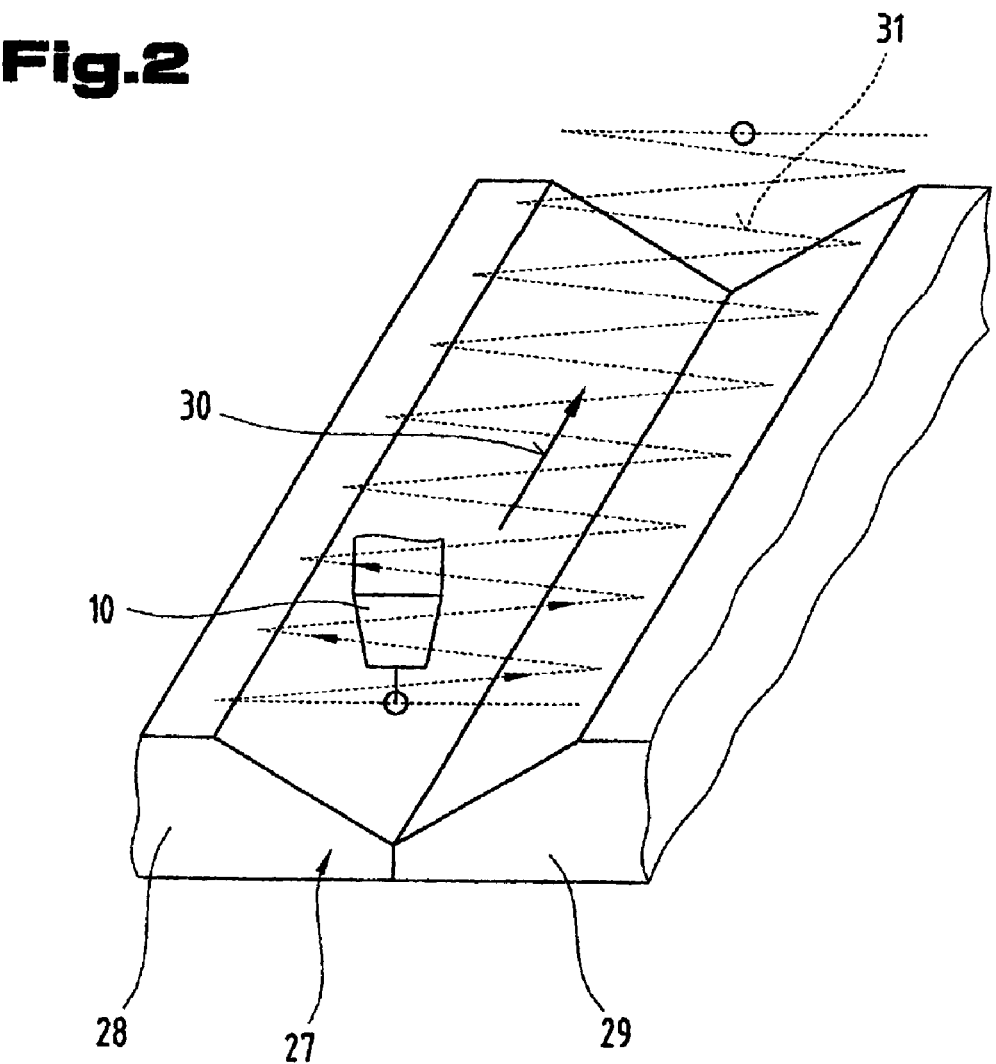
FIG. 2 is a schematic diagram of how a welding torch is guided relative to a weld line on a workpiece.
Figure 3:
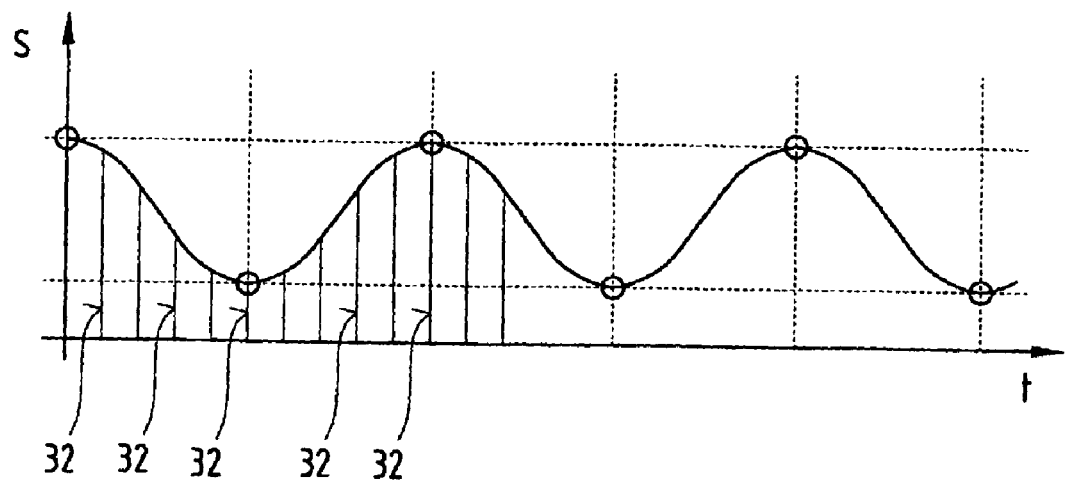
FIG. 3 is a simplified, schematic diagram plotting the signal used to determine the position of the welding torch.

FIGS. 2 and 3 illustrate a process sequence for controlling and tracking a position of the welding torch 10 and welding head, during which the welding torch 10 is guided along a welding line 27 by means of a device or system, in particular a robot system or a welding robot.

To this end, a profiled weld line 27 is illustrated as an example in FIG. 2, comprising two workpieces 28, 29 placed in abutment with one another and having matching profiled surfaces which form a V-shaped weld line 27 or weld seam in conjunction with one another. To form a welding bead in the weld line 27, the schematically illustrated welding torch 10 is positioned above the workpieces 28, 29.

The welding torch 10, spaced at a distance apart from the workpieces 28, 29 and weld seam, effects a pendulum motion which is superimposed on its linear welding motion, indicated by arrow 30, during which state variables, in particular an ohmic resistance or a current and/or a voltage, are detected as they vary in time, i.e. the welding current and/or welding voltage or the resulting resistance between the welding torch 10 and the workpiece 28, 29 are detected. The pendulum motion is shown by broken lines 31 in FIG. 2 to illustrate the way in which the welding torch 10 is displaced by the robot system. This displacement of the welding torch 10 is programmed in the robot system in a manner known from the prior art and such a displacement sequence can be produced by a robot controller working through the programme. At the same time, as mentioned above, at least one state variable of the welding process is detected at predetermined instants and processed by the robot system for the purpose of positioning and controlling or tracking the welding torch 10, i.e. the current flowing between the welding torch 10 or a contact pipe and the workpiece 28, 29 is measured once a welding process is initiated so that corresponding actual values and signals for the position of the welding torch relative to the weld line 27 or weld seam can be derived by the robot system.

A signal of this type is plotted in FIG. 3, the maximum values indicating the weld line centre and the minimum values indicating the maximum lateral deviation to the left or right. The plotted signal is made up of an individual signal 32 having varying values and actual values, as schematically illustrated in a part-region of FIG. 3, although the individual actual values of the signal 32 are processed immediately they are detected by the robot system for position control and position correction purposes. However, in order to be able to run a position-correcting process of this type, a calibration process is initially run, usually at the start of a welding process. This enables a seam centre with corresponding desired values to be determined so that the detected actual values corresponding to the values of the signal 32 can be compared subsequently, during the welding process, with the stored and determined desired values enabling the position of the welding torch 10 to be controlled during the welding process, i.e. the robot system for controlling and tracking the position of the welding torch 10 will be able to derive from the detected actual value and signals the lateral deviation of the welding torch 10 relative to the weld seam, in particular relative to the welding line centre, and/or the height of the welding torch 10 above the workpiece 28, 29 and weld seam.

Process sequences of the type described above are already known from the prior art, for example patent specifications DE 43 17 178 A1, DE 38 44 124 A1, DE 26 45 788 A1, U.S. Pat. No. 5,780,808 or U.S. Pat. No. 4,906,814 A, and the way in which the signals 32 and actual values relating to position are determined will not be discussed in further detail here. During these process sequences, an additional measuring device is used to sense the measurement values, i.e. corresponding measurement points or measurements spots at which the state variables of the welding process will be sensed, usually in the region of the welding torch 10, are fixed and the measurement points are linked by cables to an evaluating device in the robot system so that it can produce corresponding actual values for the robot controller.

The new method of determining positioning and producing the signals 32 and actual values defining the position of the welding torch 10 will now be described with reference to FIGS. 4 to 6. To this end, FIGS. 4 and 5 plot the current of an entire welding process 33, for example a pulse welding process, which, in the embodiment described here, lasts for a total duration 34.

At the start of this welding process 33, a start pulse 35 is shown, indicating ignition of the arc 15, and, once the arc 15 has been ignited, the current level is reduced to a basic current 36 for maintaining the arc 15. The basic current 36 is kept constant for a pre-settable period 37. Within this period 37, the robot system will now have the opportunity to run a calibration process, i.e. before starting the actual welding process 33, a zero calibration is run and the sensed or detected signals 32 or actual values are stored as reference values or desired values. Clearly, it would also be possible to run the calibration process during the actual welding process 33.

When the period 37 has elapsed, the welding process 33 proper is initiated by the welding device 1 or a control system 4 in the welding device 1 (see FIG. 1), made up of several periodically recurring process phases 38, i.e. the welding process 33 is made up of individual sections or process phases 38. In the embodiment illustrated as an example here, this welding process 33 is a pulse welding process, i.e. with every pulse 39, a welding droplet is detached from the welding wire 13 (see FIG. 1). The pulse welding process is therefore made up of a pulse phase 40 and a pause phase 41 at a pulse period 42 and several such pulse periods 42 occur one after the other during a welding process 33. The welding process 33 illustrated in FIG. 4 is operated with a pulse period 42 which remains constant, whereas in FIG. 5, there is a change in the pulse period 42, i.e. the period duration 44, at an instant 43. To provide a clearer illustration, FIG. 6 shows a process phase 38 of the welding process 33, in other words a single pulse period 42 in this embodiment.

As described in particular with reference to FIG. 2, for the purposes of the method proposed by the invention and with a view to continuously controlling and tracking the position of the welding torch 10 and welding head relative to a weld seam to be produced on the workpiece 28, 29, the welding torch 10, spaced at a distance from the workpiece 28, 29 and the weld seam, effects a pendulum motion which is superimposed on its linear welding motion, indicated by arrow 30, during which time state variables which vary over time, in particular an ohmic resistance or a current and/or a current, are detected.

Unlike the methods known from the prior art, the measurement values, in particular the state variables, needed to produce a signal 32 or the actual value are detected in the welding device 1, in particular at the output terminals of the welding device 1. Given that the measurement values and the signals 32 are produced by the welding device 1, in particular by the control system 3 of the welding device 1, it will be possible to make use of the monitoring systems and the measuring instruments or units used to control the welding process 33, thereby obviating the need for any additional external measuring system. The data and actual values generated by the welding device 1 are then transmitted to the robot controller for position-tracking purposes. Another option would be to run a two-way data exchange between the control system 3 of the welding device 1 and the robot controller so that corresponding control commands can be applied to or taken into account by the robot controller when generating the signals 32 and the actual values.

For the purpose of the positioning method proposed by the invention, a distinction is made between different data sets relating to the position of the welding torch 10, i.e. on the one hand between data to be processed in the welding device 1 and data which will be transmitted to the robot and the robot controller. The data and actual values that are determined, computed or processed in the welding device 1 are then designated as measurement signals 45 and the data and actual values forwarded by the welding device 1 are designated as signals 32.

Since detection of the data and the measurement signals is controlled from the welding device 1, the measurement value detection routine can be correlated with the welding process 33, i.e. depending on the periodically recurring process phases 38 of a welding process 33 as a whole, the detection routines for the measurement values of at least one measurement signal 45, in particular the detection routines for the state variable, can be run at fixed instants 46 and/or states of the periodically recurring process phases 38 of the welding process 33. The data and actual values for the position of the welding torch 10 can be detected in the welding device 1 on the basis of the measurement values of the state variables due to the fact that these measurement values are equivalent to the measurement values at the welding torch 10, i.e. an arc length or the distance of a contact pipe between the welding torch 10 and the workpiece 16, 28, 29 need not be detected directly at the welding torch 10, but can be derived directly from the state variables in the welding device 1. The measurement signals 45 of the state variables sensed in the welding device 1 and/or at the output terminals of the welding device 1 therefore correspond to a length of the arc 15 or a contact pipe distance from the weld seam or weld line 27, i.e. the process-state dependent actual values or measurement signals 45 of the state variables sensed in the welding device 1 represent an arc length equivalent and/or an equivalent of the contact pipe length from the weld seam and constitute a signal equivalent to an arc length and/or a contact pipe length.

Another advantage of using the data that is available in the welding device 1 for the welding process 33 is that no additional measuring equipment and hence no wiring is necessary, as is the case with the methods known from the prior art, thereby preventing any faulty connection of sources. One significant advantage is the fact that the internal data of the welding device 1 can be directly correlated with the welding process 33, so that any variations in the welding process 33 during set-up and/or adjustment as well as any disruptions can be taken into account when determining the measurement values, i.e. the instants or states during which the detection routines of the measurement signals 45 are run can be adapted whenever the process phases of the welding process 38 are changed.

In the embodiment illustrated as an example here, the measurement values are detected during pulse welding at fixed instants 46 or during specific process phases 38 of the pulse period 42, in particular a pulse phase 40 and/or a pause phase 41 and/or other processes states, e.g. during a short circuit etc., or during the entire period or a combination of the above. Accordingly, several measurement signals 45 can be generated during a process phase 38 or during a pulse period 42 at different instants 46 and/or states.

Figure 6:
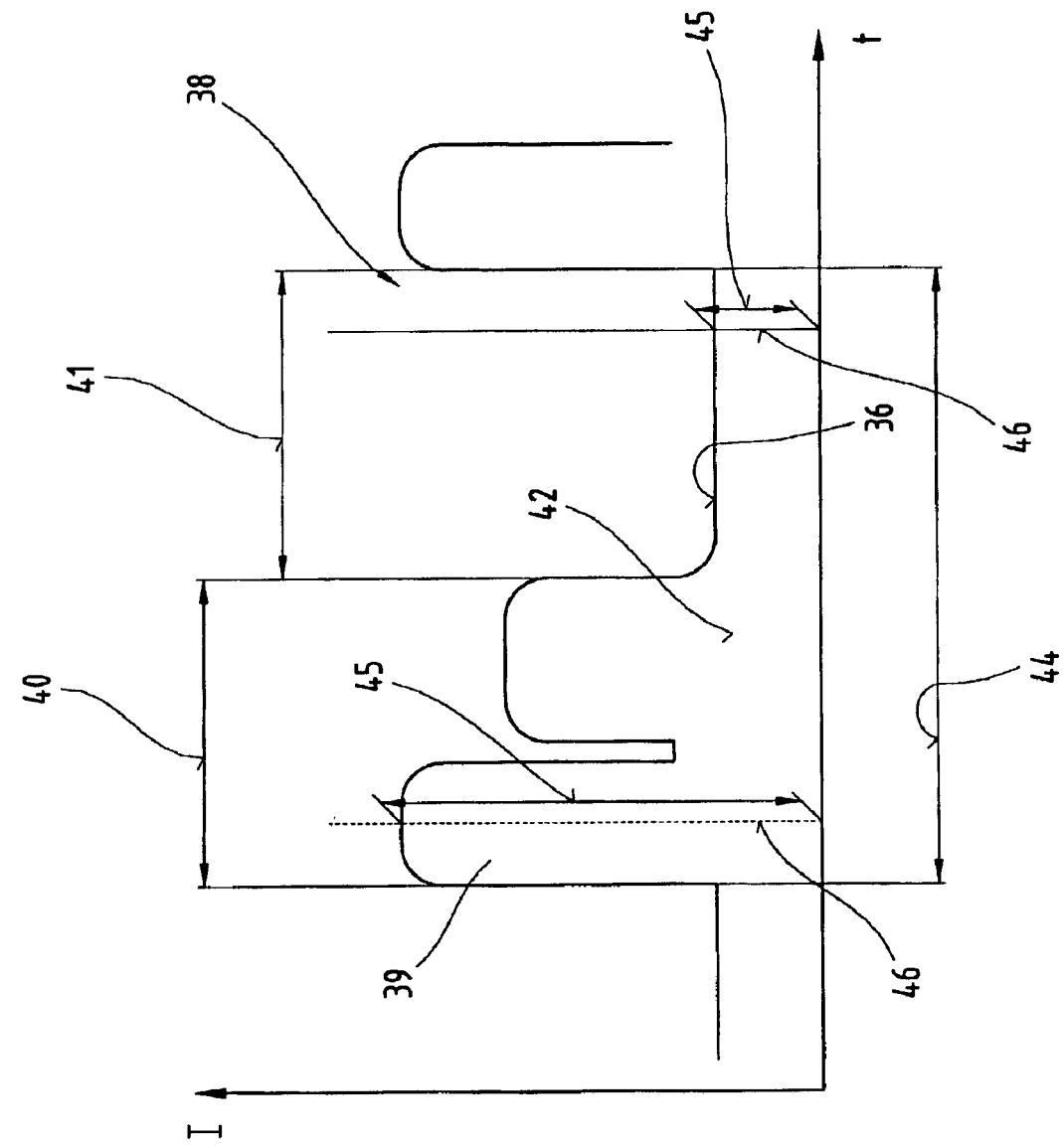
FIG. 6 is a simplified, schematic diagram showing part of a process phase of the welding process illustrated in FIG. 4 or 5.

In order to render the process of determining the measurement values and the measurement signals 45 transparent in respect of a process phase 38, the detection instants are indicated by broken lines in FIGS. 4 to 6. At these instants 46, the state variables are being sensed, i.e. the currently prevailing values of the welding current and/or the welding voltage in particular are detected and stored as a measurement signal 45 or actual value and will subsequently be processed by a control system 3 in the welding device 1 to generate a signal 32, i.e. the signal equivalent to the arc length and/or the signal equivalent to the contact pipe length will be forwarded to an external device or system, in particular a robot system.

Various different evaluation methods may then be used. One option is to transmit the generated measurement signals 45 directly to the robot controller as signals 32 or, alternatively, several measurement signals 45 may be grouped in a single signal 32. In this case however, it is preferable to group only those measurement signals 45 of one process phase 38, in other words a pulse period 42.

The control system 3 of the welding device 1 may use various methods to group several measurement signals 45 into a single signal 32. One possible option, for example, is to compute a mean value or take account of the proportion of individual measurement signals 45 on a percentage basis or sum the individual measurement values 45. The essential factor is that a signal 32 is generated that is understandable to a robot controller, in particular a signal equivalent to an arc length and/or a contact pipe length.

The key advantage of grouping several measurement signals 45 into one signal 32 is that accuracy can be very much improved and, being correlated to a process phase 38 of the welding process 33, the states of the welding process 33 can also be taken into account.

Another way of groping several measurement signals 45 is to define measurement signal parameters in a programme data bank, defining the proportions of individual measurement signals 45, in particular the individual measurement signals 45 at the different instants 46 during the welding process 33 or in the process phase 38 needed to compute and generate the signal 32, in particular the signal equivalent to the arc length and/or contact pipe length. With this option, the parameters for the measurement signals can be correlated by the programme data bank with the welding process parameters of the process phases 38 and a welding process controller. By preference, the programme data bank operates with a fuzzy logic parameter structure.

Using a programme data bank and allocating parameters for measurement signals means that the most varied of parameters, such as proportions on a percentage basis, priorities and valencies, can be assigned to the different measurement signals 45 and actual values sensed with a view to computing the signal 32, thereby enabling the quality of the signal 32 computed or generated to be significantly improved. Another advantage is that a definition of different process phases 38 can be run in the programme data bank where the parameters for the measurement signals are correlated with the welding parameters so that specific measurement signals 45 for generating the signal 32 will always be applied whenever a process phase 38 of this type is selected and/or retrieved, i.e. different instants 46 or states for detecting the state variables can be defined for different process phases 38 or the valencies or proportions of the individual actual values and measurement values 45 can be changed.

As a result, only those measurement signals 45 which are guaranteed to detect the state variables will be applied when computing the signal 32, so that any sections of a process phase 38 which carry faults or are disruptive can be gated out.

As may be seen from the embodiments illustrated as examples here, two measurement signals 45 are detected within a pulse period 42. Naturally, it would also be possible to generate several measurement signals 45 during a process phase 38. This being the case, the first measurement signal 45 will be determined in the pulse phase 40 and the second measurement signal 45 in the basic current phase 41. A single signal 32 will then be generated from these two measurement signals 45 by a control system 3 and transmitted to the robot controller. The measurement signals 45 will always be detected at the same instants 46 of a pulse period 42. This also offers the possibility of varying the period duration 44 of one or more pulse periods 42, as illustrated in FIG. 5, starting from the instant 43, in which case the instants 46 at which the measurement signals 45 are detected will be changed accordingly, i.e. the instants 46 will vary as a proportion of the pulse period 42 and the period duration 44, in other words of the process phase 38, so that the detection routines will always be run at the same state of the process.

To be absolutely clear as to how this method differs from the prior art, the detection instants 47 used by the known systems have been shown by dotted-dashed lines in FIGS. 4 and 5. Because the known methods offer no way of establishing a correlation with the welding process 33, the detection instants 47 are defined and fixed, so that once the welding process 33 has been initiated, a measurement value detection routine is run on expiry of a fixed, pre-set period 48. As may be seen from FIG. 4, if the process phases 38 remain unchanged, this is always run during a specific state of the welding process 33 and the values of the detected state variables will therefore not vary very much in relation to one another, making it possible to operate a position control via the robot controller on the basis of the state variables. However, this is barely feasible in practice because disruptive influences, changes of materials, supply fluctuations, etc. affect the welding process 33 and the individual process phases 38 of the welding process 33 have to be repeatedly controlled and adjusted by the welding device 1 (see FIG. 1).

If, however at least one process phase 38 of the welding process 33 changes within a period duration 44, as illustrated with effect from instant 43 in FIG. 5, the individual detection instants 47 are not changed in the methods known from the prior art so that a situation will now arise in which these detection instants 47 coincide with a whole series of different states of the pulse period 42 and the process phases 38. Consequently, the measurement results will always be different, for example because the detection routine will be run at one point in the pulse phase 40 and another time in the basic current phase 41, which means that the values of the state variables will deviate from one another significantly every time, making it impossible to determine the exact position for the welding torch 10, and the robot controller will be unable to correct the position on a continuous basis.

Due to the fact that detection of the state variables is correlated to the welding process 33 in the method proposed by the invention, the instants 46 or states at which the measurement value detection routines for the measurement signals 45 are run will be adapted to new process phases 38 of the welding process 33 whenever these are changed, as illustrated in FIG. 5, which means that measurements will always be taken in the same process phase 38. Consequently, large deviations will never occur and the position of the welding torch 10 with respect to the welding line 27 can always be detected with total reliability. Another significant aspect is the fact that when the measurement signals 45 are evaluated, the states of the welding process 33 can be taken into account, enabling corrections to be applied accordingly, i.e. if one measurement is taken in the pulse phase 40 and one measurement is taken in the pause phase 41, these two measurement signals 45 can be reconciled with one another because the control system 3 of the welding device 1 is always kept informed and aware of the current states and process phases 38 of the welding process 33. This might be necessary insofar as a higher value always prevails in the pulse phase 40 than in the pause phase 41 and adaptation will then be possible using an appropriate evaluation mode, enabling a corresponding signal 32 to be generated for the robot controller. Naturally, it would also be possible to group several measurement signals 45 from different process phases 38 in one signal 32.

It may therefore be said that the measurement signals 45 determined and generated during a periodically recurring process phase 38, in particular a pulse period 42, are processed to generate one signal 32 by means of an evaluating device in the welding device 1 or the control system 3 in the welding device 1, so that the instants 46 or the states at which the measurement value detection routines for the measurement signals 45 are run will be adapted to new process phases 38 of the welding process 33 whenever these are changed. The signals 32 and actual values for positioning purposes therefore correspond to the signals 32 described with reference to FIG. 3, and these signals 32 can therefore be used for position control purposes and forwarded to an external device or system.

Clearly, the state variables could also be sensed directly at the welding torch 10, in which case the sensed measurement signals 45 would be transmitted from the welding torch 10 to the welding device 1, in particular to the control system 3 via a field bus or control lines, to enable the signals 32 to be generated by the welding device 1 or from the control system 3 of the welding device 1 and hence correlated to the welding process 33. Another option is to detect the state variables directly on the welding torch via measuring lines. If using this type of measuring method, however, care must be taken to ensure that the sensed actual values and measurement signals 45 are correlated with and linked into the welding process 33 and the process phase 38.

Naturally, it would also be possible to use the method described above for other welding processes. Accordingly, in a short arc welding process, the measurement values would be detected during short circuit welding at fixed instants or during fixed states of the process, depending on the short circuit frequency, and the short circuit frequency used as a measurement value, which will again enable several measurement signals 45 to be determined and then converted to a signal 32.

The significant aspect of the different individual welding processes is that the measurement values are always detected in correlation with the welding process 33 and because detection of the measurement values and/or the evaluation process is correlated with the welding process 33, any changes in the welding process 33 can be taken into account. Accordingly, changes can be made to the welding process 33 independently or can be programmed using a stored welding programme. This will also allow the current strength to be increased due to an increase in material with effect from a specific instant and a specific flag so that the values sensed by the measurement value detection routines and the instants 46 can be adjusted to the new settings and parameters.

In yet another option, because the signals 32 are generated by the welding device 1 and by the control system 4 of the welding device 1, the process-dependent signals 32 and actual values can also be evaluated by the control system 4 of the welding device 1 or at least one other control system in the welding device 1, in which case the control system 4 will transmit one or several correction value(s) for the position of the welding torch 10 to the device or system connected to the welding device 1, in particular a welding robot or a robot system, i.e. the data relating to the spatial position of the welding torch 10 will be transmitted directly from the welding device 1 or the control system 4, in which case the robot system will merely have to act on the positioning information. There will no need for an evaluation in the robot system because the position is determined exclusively by the welding device 1 in this instance and the desired/actual comparison takes place in the welding device 1.

To this end, it is of advantage to run a two-way data exchange between the welding device 1 and the robot system, in which case the requisite directional instructions for the sequence of motions to be performed by the welding torch 10 can be provided from the welding device 1 and the control system 4 accordingly. Consequently, a direction signal for the displacement of the welding torch 10 can be transmitted to the welding device 1, in particular the control system 4, from the robot system. When the process is initiated, the desired values for the spatial position of the welding torch 10 and welding head are preferably transmitted to the welding device 1, in particular the control system 4, and, once the signals 32 have been generated, a desired/actual comparison can be run. Accordingly, the entire evaluation will be run by the welding device 1 and the settings for displacement of the robot arm of the robot system determined by the welding device 1.

Naturally, as part of the process of generating a signal or continuously controlling and tracking a position of the welding torch 10 and welding head relative to a weld seam to be produced on a workpiece 16, 28, 29, other parameters of the welding device 1 and the robot system, such as the wire feed rate, welding speed, etc., can also be taken into account.

Another possibility is to run the method described above from an external control system. In this case, care must be taken to ensure that the control system can be linked into the welding process 33 so that the measurement value detection routines for the measurement signals 45 will always be run depending on a process phase 38 of the welding process 33. The external control system can then assume the task of generating the signal 32 from the measurement signals 45 and running the entire evaluation to determine the position of and guide the welding torch 10.

Finally, it should be pointed out that individual parts and features illustrated the embodiments described above are shown on a disproportionately large scale in the drawings in order to provide a clear understanding of the solution proposed by the invention. Individual parts and aspects of the combinations of features described above in respect of the individual embodiments may be used in combination with other individual features from the other embodiments and construed as independent solutions of the invention.

List of Reference Numbers

1 Welding device
2 Current source
3 Power component
4 Control system
5 Switching element
6 Control line
7 Supply line
8 Gas
9 Gas storage
10 Welding torch
11 Wire feed device
12 Wire guide line
13 Welding wire
14 Supply reel
15 Arc
16 Workpiece
17 Welding line
18 Welding line
19 Cooling circuit
20 Flow indicator
21 Water container
22 Input and/or output device
23 Hose pack
24 Connector device
25 Tension-relieving device
26 Housing
27 Weld line
28 Workpiece
29 Workpiece
30 Arrow
31 Line
32 Signal
33 Welding process
34 Total duration
35 Start pulse
36 Basic current
37 Period
38 Process phase
39 Pulse
40 Pulse phase
41 Pause phase
42 Pulse period
43 Instant
44 Period duration
45 Measurement signal
46 Instant
47 Detection instant
48 Period

What is claimed is:

1. Method of continuously controlling and tracking a position of a welding torch and a welding head relative to a weld seam to be produced on a workpiece, wherein the welding torch is spaced at a distance apart from the workpiece and the weld seam, and effects a pendulum motion which is superimposed on its linear welding motion, electric state variables are detected as they vary in time, the lateral deviation of the welding torch from the weld seam, in particular from the weld seam center, and/or the height of the welding torch above the workpiece and weld seam being derived from the detected actual value signals in order to control and track the position of the welding torch, characterised in that process-dependent actual values are evaluated by a control system of the welding device or at least one other control system in the welding device, whereupon the control system transmits one or more correction value(s) relating to the position of the welding torch to a device or system connected to the welding device, in particular a welding robot or a robot system, and a measurement value is detected during specific process phases of a pulse period during pulse welding, several measurement signals being generated during a pulse period, and specific process phases during the pulse period are detected solely on the basis of the electric state variable value signals generated in the welding device during the welding process.

2. Method as claimed in claim 1, characterised in that the measurement signals are detected at the output terminals of the welding device.

3. Method as claimed in claim 1, characterised in that a measurement value detection is run during a pulse phase and/or a basic current phase and/or another process state, such as during a short circuit, or the entire period or a combination thereof.

4. Method as claimed in claim 1, characterised in that a measurement value detection during short arc welding is run depending on the short circuit frequency and the short circuit frequency constitutes the measurement value.

5. Method as claimed in claim 1, characterised in that the actual value signals of the detected electric state variables represent an arc length equivalent and/or a contact pipe length equivalent to the weld seam.

6. Method as claimed in claim 1, characterised in that the electric state variables are detected directly at the welding torch and the sensed actual value signals are transmitted from the welding torch to the control system of the welding device via a field bus or control lines.

7. Method as claimed in claim 1, characterised in that the electric state variables are detected directly at the welding torch via measuring lines.

8. Method as claimed in claim 1, characterised in that the electric state variables are adapted to changed process phases of the welding process for the detection of the actual value signals.

9. Method as claimed in claim 1, characterised in that a zero calibration is run before the start of the welding process and the detected actual value signals are stored as reference values or desired values.

10. Method as claimed in claim 1, characterised in that the measurement signals produced or generated during periodically recurring process phases, in particular the pulse period, are processed to generate the actual value signal by an evaluating device in the control system of the welding device.

11. Method as claimed in claim 1, characterised in that an arc length equivalent and/or contact pipe length equivalent signal computed from the electric state variables is forwarded to an external device or system.

12. Method as claimed in claim 1, characterised in that measurement signal parameters defined in a program data bank define proportions of individual measurement signals for computing the signal, in particular the arc length equivalent and/or contact pipe length equivalent signal.

13. Method as claimed in claim 1, characterised in that a program data bank is based on a fuzzy logic parameter structure.

14. Method as claimed in claim 1, characterised in that a direction signal for the displacement of the welding torch is transmitted from a robot system to the control system of the welding device.

15. Method as claimed in claim 1, characterised in that the desired values for the spatial position of the welding torch and welding head are transmitted by a robot system to the control system of the welding device, in particular the control system.

16. Method as claimed in claim 1, characterised in that the welding device assumes the role of fixing the settings for the displacement of the robot arm of a robot system.

17. Method of generating a signal for continuously controlling and tracking a position of a welding torch and welding head relative to a weld seam to be produced on a workpiece, wherein the welding torch is spaced at a distance apart from the workpiece and the weld seam, and effects a pendulum motion which is superimposed on its linear welding motion, electric state variables are detected as they vary in time, the lateral deviation of the welding torch from the weld seam, in particular from the weld seam center, and/or the height of the welding torch above the workpiece and the weld seam being derived from the detected actual value signals in order to control and track the position of the welding torch, characterised in that, depending on periodically recurring process phases of a welding process, a measurement value detection for at least one measurement signal of the detected electric state variable is run at states of the periodically recurring process phases of a pulse period of the welding process, measurement signal parameters are defined in a program data bank, which are correlated with welding process parameters of the process phases and a welding process controller, and the process phases during the pulse period are detected solely on the basis of the electric state variable value signals generated in the welding device during the welding process.

18. Method of continuously controlling and tracking a position of a welding torch and a welding head relative to a weld seam to be produced on a workpiece, wherein the welding torch is spaced at a distance apart from the workpiece and the weld seam, and effects a pendulum motion which is superimposed on its linear welding motion, electric state variables are detected as they vary in time, the lateral deviation of the welding torch from the weld seam, in particular from the weld seam center, and/or the height of the welding torch above the workpiece and weld seam being derived from the detected actual value signals in order to control and track the position of the welding torch, characterised in that process-dependent actual values are evaluated by a control system of the welding device or at least one other control system in the welding device, whereupon the control system transmits one or more correction value(s) relating to the position of the welding torch to a device or system connected to the welding device, in particular a welding robot or a robot system, and a measurement value is detected at fixed points in time, the fixed points in time are detected solely on the basis of the electric state variable value signals generated in the welding device during the welding process, and an arc length equivalent and/or contact pipe equivalent signal computed from the electric state variables is forwarded to an external device or system.

19. Method of generating a signal for continuously controlling and tracking a position of a welding torch and welding head relative to a weld seam to be produced on a workpiece, wherein the welding torch is spaced at a distance apart from the workpiece and the weld seam, and effects a pendulum motion which is superimposed on its linear welding motion, electric state variables are detected as they vary in time, the lateral deviation of the welding torch from the weld seam, in particular from the weld seam center, and/or the height of the welding torch above the workpiece and the weld seam being derived from the detected actual value signals in order to control and track the position of the welding torch, characterised in that, depending on periodically recurring process phases of a welding process, a measurement value detection for at least one measurement signal of the detected electric state variables is run at fixed instants of the welding process, measurement signal parameters are defined in a program data bank, which are correlated with welding process parameters of the process phases and a welding process controller, the fixed instants are detected solely on the basis of the electric state variable value signals generated in the welding device during the welding process, and an arc length equivalent and/or contact pipe equivalent signal computed from the electric state variables is forwarded to an external device or system.

* * * * *